(12) United States Patent
Xiong

(10) Patent No.: US 10,203,092 B2
(45) Date of Patent: Feb. 12, 2019

(54) LASER PROJECTION LAMP

(71) Applicant: ZHONGSHAN DAQI ELECTRONICS CO., LTD., Guangdong (CN)

(72) Inventor: Li Gao Xiong, Guangdong (CN)

(*) Notice: Subject to any disclaimer, the term of this patent is extended or adjusted under 35 U.S.C. 154(b) by 125 days.

(21) Appl. No.: 15/494,559

(22) Filed: Apr. 24, 2017

(65) Prior Publication Data

US 2018/0283657 A1    Oct. 4, 2018

(30) Foreign Application Priority Data

Mar. 28, 2017    (CN) ...................... 2017 2 0316586 U

(51) Int. Cl.
| | |
|---|---|
| *F21V 14/04* | (2006.01) |
| *F21V 14/06* | (2006.01) |
| *F21V 21/08* | (2006.01) |
| *F21V 7/04* | (2006.01) |
| *F21V 5/00* | (2018.01) |
| *F21S 8/08* | (2006.01) |

(52) U.S. Cl.
CPC .............. *F21V 14/06* (2013.01); *F21S 8/081* (2013.01); *F21V 5/004* (2013.01); *F21V 7/04* (2013.01); *F21V 14/04* (2013.01); *F21V 21/0824* (2013.01)

(58) Field of Classification Search
CPC ......... F21S 10/007; F21S 8/081; F21V 13/06; F21V 5/004; F21V 14/04; F21V 14/06; F21V 21/0824; G03B 21/2033; G03B 21/204
See application file for complete search history.

(56) References Cited

U.S. PATENT DOCUMENTS

| | | | |
|---|---|---|---|
| 2009/0185377 A1* | 7/2009 | Johnson | .............. F21V 21/0824 362/259 |
| 2016/0341390 A1* | 11/2016 | Yamamura | ............ F21S 41/147 |

\* cited by examiner

*Primary Examiner* — Anh T Mai
*Assistant Examiner* — Steven Y Horikoshi
(74) *Attorney, Agent, or Firm* — Prakash Nama; Global IP Services, PLLC

(57) ABSTRACT

The patent discloses a novel laser projection lamp which comprises a shell body, a face cover, a base, a connecting rod and a ground insert, wherein base is arranged at the bottom of shell body, connecting rod is movably connected to base, ground insert is movably connected to the bottom of connecting rod, and face cover is arranged on one side of shell body; a driving mechanism, a reflecting mechanism and a laser assembly are further arranged in shell body; the novel laser projection lamp is further provided with a lens module which is arranged in a through hole of the face cover. The patent is simple in structure and convenient to use; white laser light can reflect a plurality of white spots to creat a good environmental atmosphere; and driving mechanism can control white spots rotate or be maintained at specified positions.

8 Claims, 3 Drawing Sheets

LASER PROJECTION LAMP

BACKGROUND OF THE INVENTION

The patent relates to the field of outdoor illuminating equipment, in particular to a novel laser projection lamp.

Since the light projection distance of laser projection lamps is long, laser projection lamps are becoming more and more popular among manufacturers and merchants; and since light beams of the laser projection lamps are relatively centralized, the laser projection lamps are also frequently used for festival decoration, and a better festival atmosphere in the environment is achieved.

However, the color of laser light of existing laser projection lamps is simple. White laser light is generally synthesized from light in multiple colors, and consequentially, white laser light with poor monochromaticity is extremely difficult to output.

BRIEF SUMMARY OF THE INVENTION

For overcoming the defects of the prior art, the patent aims to provide a novel laser projection lamp, and white laser light which is easy to output is formed by combining blue laser light with materials; furthermore, a driving mechanism and a reflecting mechanism are arranged, and the projection effect of the white laser light passing through a lens module is achieved through a rotating state or a static state.

According to the technical scheme adopted by the patent for achieving the above purposes:

A novel laser projection lamp comprises a shell body, a face cover, a base, a connecting rod and a ground insert, wherein the base is arranged at the bottom of the shell body, the connecting rod is movably connected to the base, the ground insert is movably connected to the bottom of the connecting rod, and the face cover is arranged on one side of the shell body; a driving mechanism, a reflecting mechanism and a laser assembly are further arranged in the shell body, wherein the driving mechanism is connected with the reflecting mechanism, and the projection included angle between the laser assembly and the reflecting mechanism is 30-60 degrees; the novel laser projection lamp is further provided with a lens module, and the lens module is arranged in a through hole of the face cover.

What needs to be pointed out is that the laser assembly is composed of blue laser light and fluorescent powder, and white laser light required by the patent can be formed through the combination method.

What needs to be pointed out is that the driving mechanism comprises a stepping motor, a rotary table and a supporting frame, wherein the stepping motor is arranged on the supporting frame, one side of the rotary table is connected to a rotary shaft of the stepping motor in an inserted mode, and the reflecting mechanism is connected with the other side of the rotary table.

As a preferred technical scheme, the driving mechanism can select a rotating state or a static state according to different projection requirements.

What needs to be pointed out is that the reflecting mechanism is composed of a reflector, and the diameter of the reflector is larger than or equal to the diameter of the rotary table.

What further needs to be pointed out is that the reflector is provided with a concave arc-surface reflecting area.

What further needs to be pointed out is that the novel laser projection lamp is further provided with a plurality of micro-lenses, and the peripheries of the multiple micro-lenses are closely connected and arranged on the surface of the reflecting area in a covering mode.

What further needs to be pointed out is that the multiple micro-lenses are in regular polygon shapes.

As a preferred technical scheme, the projection included angle is 45 degrees.

What further needs to be pointed out is that the lens module comprises a sealing ring, a glass mirror and a gland, wherein the sealing ring is embedded in the through hole, the gland is fixedly connected with the periphery of the through hole, and the glass mirror is arranged between the sealing ring and the gland.

The patent has the beneficial effects that:

1. The structure is simple, and using is convenient;
2. White laser light emitted by the laser assembly can reflect a plurality of white spots through the multiple micro-lenses on the reflector, and thus a good environmental atmosphere is created;
3. The driving mechanism can select a rotating state or a static state to make the multiple reflected white spots rotate or be maintained at specified positions.

DETAILED DESCRIPTION OF THE INVENTION

A further description of the patent is given with accompanying drawings as follows, and what needs to be pointed out is that the embodiment provides the detailed description and specific operation process based on the technical scheme, however, the protection scope of the patent is not limited to the embodiment.

Figure 1:
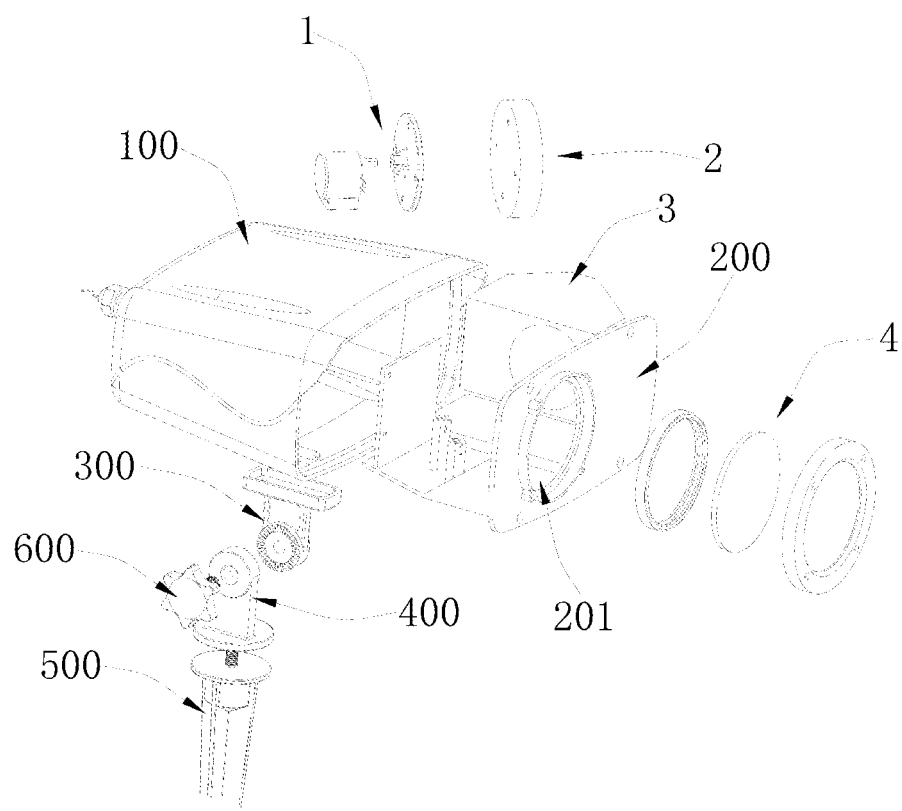
FIG. 1 is an exploded structural schematic diagram of the utility mode.

As is shown in FIG. 1, a novel laser projection lamp of the patent comprises a shell body 100, a face cover 200, a base 300, a connecting rod 400 and a ground insert 500, wherein the base 300 is arranged at the bottom of the shell body 100, the connecting rod 400 is movably connected to the base 300, the ground insert 500 is movably connected to the bottom of the connecting rod 400, and the face cover 200 is arranged on one side of the shell body 100; a driving mechanism 1, a reflecting mechanism 2 and a laser assembly 3 are further arranged in the shell body 100, and the driving mechanism 1 is connected with the reflecting mechanism 2.

Furthermore, as is shown in FIG. 1, the novel laser projection lamp of the patent further comprises a lens module 4, and the laser module 4 is arranged in a through hole 201 of the face cover 200.

What needs to be pointed out is that the laser assembly of the patent is composed of blue laser light and fluorescent powder, and white laser light required by the patent can be formed through the combination method.

What further needs to be pointed out is that the fluorescent powder can be fluorescent powder applied to laser projection in the prior art.

Figure 2:
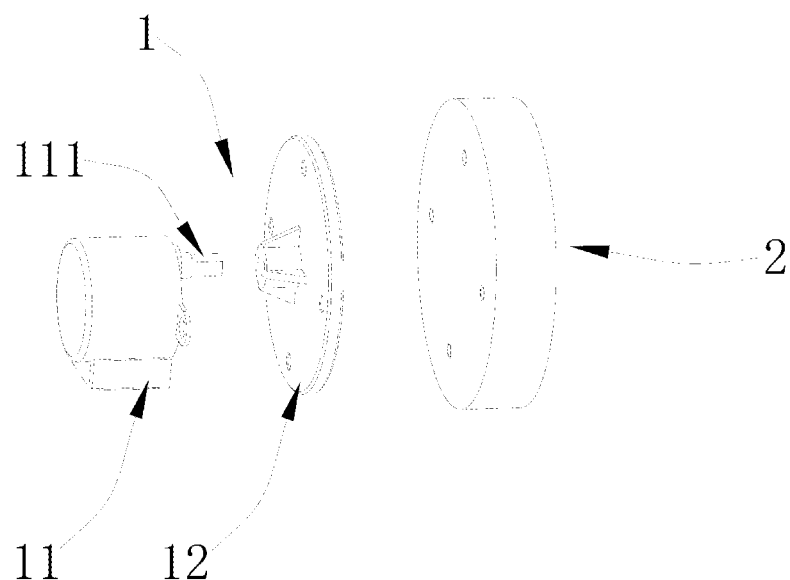
FIG. 2 is a structural schematic diagram of a driving mechanism and a reflecting mechanism in FIG. 1.

As is shown in FIG. 2, the driving mechanism 1 further comprises a stepping motor 11, a rotary table 12 and a supporting frame, wherein the stepping motor 11 is arranged on the supporting frame, one side of the rotary table 12 is connected to a rotary shaft 111 of the stepping motor 11 in an inserted mode, and the reflecting mechanism 2 is connected with the other side of the rotary table 12.

What further needs to be pointed out is that for achieving a good reflection effect, the reflecting mechanism is composed of a reflector, and the diameter of the reflector is larger than or equal to the diameter of the rotary table.

As a preferred technical scheme, the driving mechanism can select a rotating or a static state according to different projection requirements, namely when the driving mechanism drives the reflecting mechanism to rotate, a plurality of white spots which are reflected by the reflecting mechanism through white laser light emitted by the laser assembly can rotate accordingly; and when the driving mechanism stops rotating, the multiple white spots which are reflected by the reflecting mechanism through the white laser light emitted by the laser assembly are static and maintained at specified positions.

For improving the reflection effect, the reflector is provided with a concave arc-surface reflecting area.

Furthermore, for making the white laser light emitted by the laser assembly form multiple white spots, a plurality of micro-lenses are further arranged in the reflector, and the peripheries of the multiple micro-lenses are closely connected and arranged on the surface of the reflecting area in a covering mode.

Furthermore, the multiple micro-lenses are in regular polygon shapes. As a preferred technical scheme, the regular polygon can be square, rhombic, regular hexagonal and the like.

Figure 5:
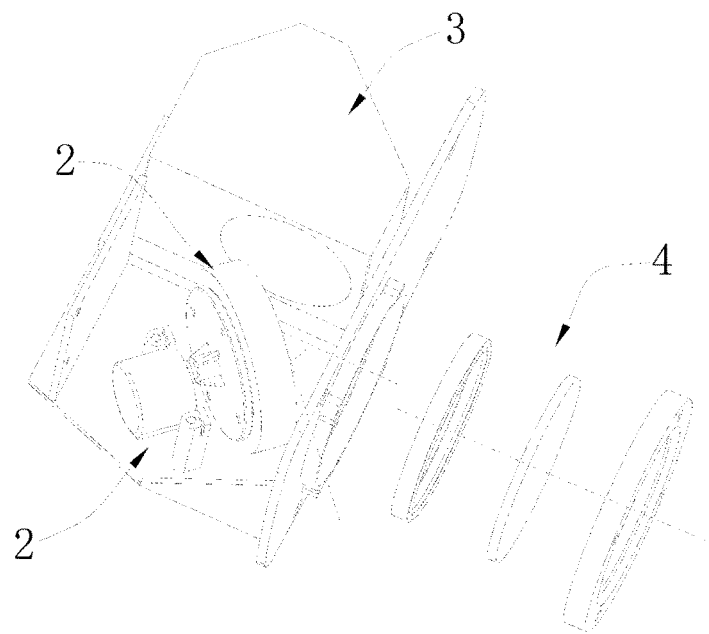
FIG. 5 is a positional relation schematic diagram of the driving mechanism, the reflecting mechanism and a laser assembly in FIG. 1.
Figure 6:
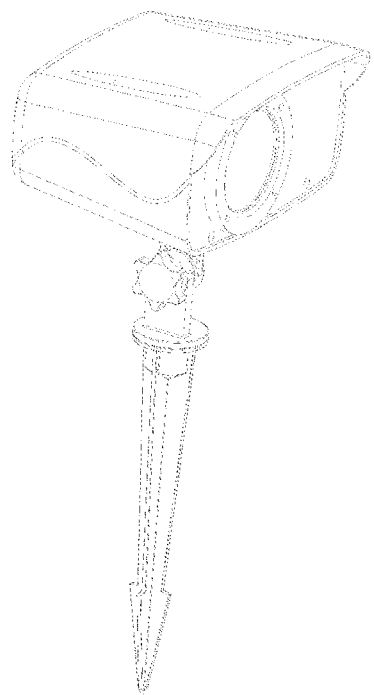
FIG. 6 is a using state reference diagram of FIG. 1.

As is shown in FIG. 5, with the central axis of the lens module 4 as the datum, the driving mechanism 1 and the reflecting mechanism 2 are arranged obliquely, and for achieving the projection effect, a certain projection included angle is formed between the laser assembly 3 and the reflecting mechanism 2.

Furthermore, for achieving an excellent projection effect, the projection included angle between the laser assembly and the reflecting mechanism is 30-60 degrees.

For achieving the optimal projection effect, as a preferred technical scheme, the projection included angle is 45 degrees.

Figure 3:
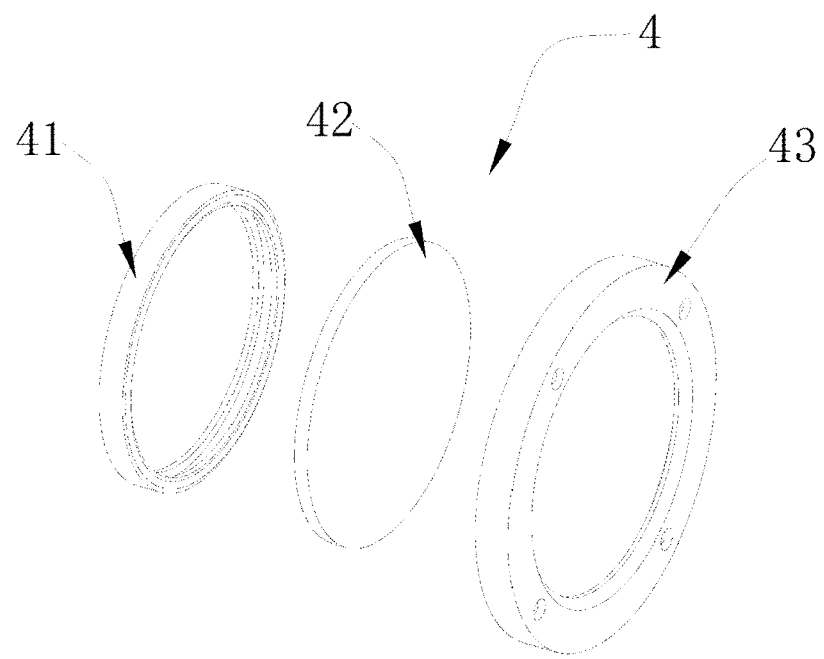
FIG. 3 is a mechanism schematic diagram of a lens module in FIG. 1.

As is shown in FIG. 3, what needs to be further pointed out is that the lens module 4 comprises a sealing ring 41, a glass mirror 42 and a gland 43, wherein the sealing ring 41 is embedded in the through hole, the gland 43 is fixedly connected with the periphery of the through hole, and the glass mirror 42 is arranged between the sealing ring 41 and the gland 43.

Figure 4:
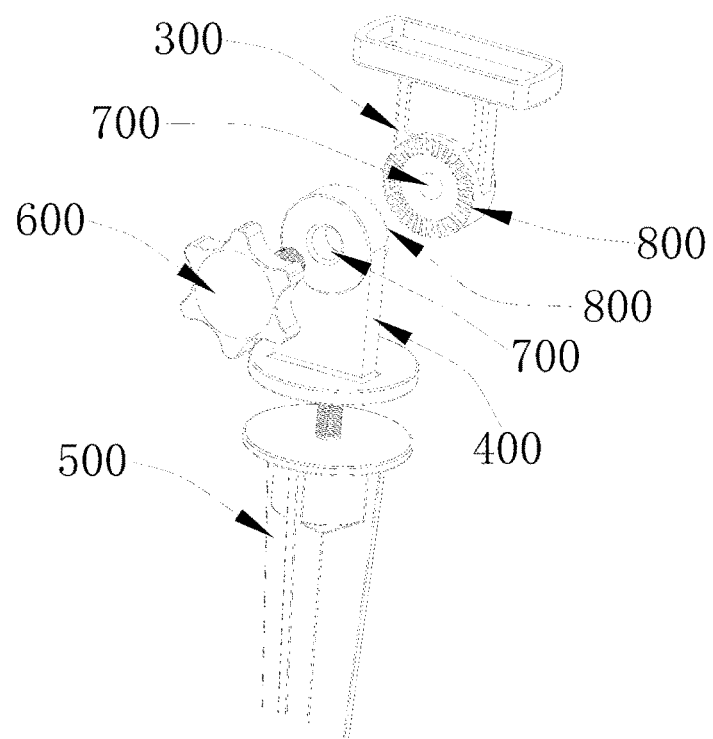
FIG. 4 is a structural schematic diagram of a base, a connecting rod and an adjustment knob in FIG. 1.

As is shown in FIG. 1 and FIG. 4, for adjusting the depression/elevation projection angle of the patent, an angle adjustment knob 600 can also be arranged, the connecting rod 400 and the base 300 are provided with adjustment holes 700 corresponding in position and identical in size respectively, and the adjustment knob 600 is connected into the adjustment hole 700 in a screwed mode.

When the depression/elevation projection angle needs to be adjusted, the adjustment knob can be rotated to be released, then the shell body can be swung up and down for adjustment of the depression/elevation projection angle, and the adjustment knob is rotated to be screwed after adjustment.

Furthermore, for achieving fine adjustment of the depression/elevation angle, as is shown in FIG. 4, racks 800 which are engaged with each other are arranged on the surface peripheries of the connecting rod 400 and the base 300 correspondingly, and the distance of each rack 800 is equal to each angular distance, so that one angle is adjusted by rotating each rack 800, and thus the requirement for accurate control over the depression/elevation angle is met.

Embodiment

The novel laser projection lamp is mounted in a specified position through the ground insert in use, then the novel laser projection lamp of the patent can be turned on, blue laser light of the laser assembly forms white laser light through material combination, and the white laser light is emitted out; the reflector of the reflecting mechanism receives the white laser light, and the white laser light is reflected to the lens module through the multiple micro-lenses of the reflector and finally reflected to the required area through the lenses.

According to the above description, what needs to be pointed out is that a user can select to start or not to start the driving mechanism according to different requirements; since the reflecting mechanism is connected to the rotary table of the driving mechanism, when the driving mechanism rotates, the reflector of the reflecting mechanism rotates accordingly, a plurality of white spots reflected by the multiple micro-lenses on the reflector rotate simultaneously at the moment, and a dynamic projection effect is formed; furthermore, when the driving mechanism is static, the multiple white spots reflected by the multiple micro-lenses are maintained at specified positions, and a static projection effect is formed.

For those skilled in the field, other various corresponding changes or transformations can be made according to the above technical scheme and the concept, and all the changes and transformations should be in the protection scope of the claims of the patent.

What is claimed is:

1. A novel laser projection lamp, comprising a shell body, a face cover, a base, a connecting rod and a ground insert, wherein the base is arranged at the bottom of the shell body, the connecting rod is movably connected to the base, the ground insert is movably connected to the bottom of the connecting rod, and the face cover is arranged on one side of the shell body; characterized in that a driving mechanism, a reflecting mechanism and a laser assembly are further arranged in the shell body, wherein the driving mechanism is connected with the reflecting mechanism, and the projection included angle between the laser assembly and the reflecting mechanism is 30-60 degrees; the novel laser projection lamp further comprises a lens module which is arranged in a through hole of the face cover.

2. The novel laser projection lamp according to claim 1, characterized in that the driving mechanism comprises a stepping motor, a rotary table and a supporting frame, the stepping motor is arranged on the supporting frame, one side of the rotary table is connected to a rotary shaft of the stepping motor in an inserted mode, and the reflecting mechanism is connected with the other side of the rotary table.

3. The novel laser projection lamp according to claim 2, characterized in that the reflecting mechanism is composed of a reflector, and the diameter of the reflector is larger than or equal to the diameter of the rotary table.

4. The novel laser projection lamp according to claim 3, characterized in that the reflector is provided with a concave arc-surface reflecting area.

5. The novel laser projection lamp according to claim 4, characterized in that the novel laser projection lamp is further provided with a plurality of micro-lenses, and the peripheries of the multiple micro-lenses are closely connected and arranged on the surface of the reflecting area in a covering mode.

6. The novel laser projection lamp according to claim 5, characterized in that the multiple micro-lenses are in regular polygon shapes.

7. The novel laser projection lamp according to claim 1, characterized in that the projection included angle is 45 degrees.

8. The novel laser projection lamp according to claim 1, characterized in that the lens module comprises a sealing ring, a glass mirror and a gland, wherein the sealing ring is embedded in the through hole, the gland is fixedly connected with the periphery of the through hole, and the glass mirror is arranged between the sealing ring and the gland.

\* \* \* \* \*